(12) United States Patent
Wong et al.

(10) Patent No.: US 8,162,263 B2
(45) Date of Patent: Apr. 24, 2012

(54) PAYLOAD QUICK RELEASE FOR AN AERIAL SYSTEM

(75) Inventors: Kimberly Wong, Albuquerque, NM (US); Armand Losinski, Albuquerque, NM (US)

(73) Assignee: Honeywell International Inc., Morristown, NJ (US)

( * ) Notice: Subject to any disclaimer, the term of this patent is extended or adjusted under 35 U.S.C. 154(b) by 467 days.

(21) Appl. No.: 12/415,463

(22) Filed: Mar. 31, 2009

(65) Prior Publication Data

US 2010/0243815 A1    Sep. 30, 2010

(51) Int. Cl.
*B64D 1/12* (2006.01)
(52) U.S. Cl. .................................. 244/137.4
(58) Field of Classification Search ............ 294/82.24, 294/82.26, 82.31, 82.33–82.35; 89/1.54, 89/1.58; 244/137.1, 137.4, 173.1, 173.3
See application file for complete search history.

(56) References Cited

U.S. PATENT DOCUMENTS

| | | | |
|---|---|---|---|
| 2,478,019 A * | 8/1949 | Sonntag ........................ 410/68 |
| 3,430,184 A * | 2/1969 | Acord ........................... 439/255 |
| 4,695,109 A | 9/1987 | Ratchford |
| 5,406,876 A * | 4/1995 | Harless et al. .................. 89/1.54 |
| 5,605,308 A * | 2/1997 | Quan et al. ................... 244/173.3 |
| 5,779,190 A | 7/1998 | Rambo et al. |
| 6,213,521 B1 | 4/2001 | Land et al. |
| 6,234,558 B1 * | 5/2001 | Curtindale ..................... 296/97.9 |
| 6,305,653 B1 | 10/2001 | Oldham et al. |
| 6,416,018 B2 * | 7/2002 | DiVerde et al. ............. 244/137.1 |
| 2003/0230694 A1 | 12/2003 | Kalb |
| 2006/0192047 A1 * | 8/2006 | Goossen ..................... 244/17.23 |
| 2008/0035786 A1 | 2/2008 | Bilyk et al. |
| 2008/0116338 A1 | 5/2008 | Kalb |

* cited by examiner

*Primary Examiner* — Timothy D Collins
*Assistant Examiner* — Jamie S Stehle
(74) *Attorney, Agent, or Firm* — Shumaker & Sieffert, P.A.

(57) ABSTRACT

A payload quick release mechanism for an unmanned aerial vehicle is provided. This mechanism is affixed to a structure on the unmanned aerial vehicle, and allows for quick attachment and removal of a payload from the unmanned aerial vehicle. The attachment device includes a body with a perimeter and a plurality of arms that extend from the body perimeter. Each arm includes an indented section, within which a tab extending from the payload top may be placed. When the payload tab rests within the indented section, the payload is prevented from translation and is attached to the mechanism.

20 Claims, 5 Drawing Sheets

PAYLOAD QUICK RELEASE FOR AN AERIAL SYSTEM

GOVERNMENT RIGHTS

The United States Government has acquired certain rights in this invention pursuant to Contract Number W56 HZV-05-C-0724, awarded by the U.S. Army Tank Automotive and Armaments Command.

FIELD

The present invention relates generally to aerial vehicles. More particularly, the present invention relates to a mechanism with a quick release to attach and remove a payload from a ducted fan unmanned aerial vehicle.

BACKGROUND

Unmanned aerial vehicles (UAVs) are remotely piloted or self-piloted aircraft that can carry cameras, sensors, communications equipment, or other payloads. A UAV is capable of controlled, sustained flight and is often powered by either a gas turbine or a reciprocating internal combustion engine. The UAVs may be remotely controlled or may fly autonomously based on pre-programmed flight plans or more complex dynamic automation systems.

UAVs have become increasingly used for various applications where the use of manned flight vehicles is not appropriate or is not feasible. Such applications may include military situations, such as surveillance, reconnaissance, target acquisition, data acquisition, communications relay, decoy, harassment, or supply flights. These vehicles are also used in a growing number of civilian applications, such as firefighting when a human observer would be at risk, police observation of civil disturbances or crime scenes, reconnaissance support in natural disasters, and scientific research, such as collecting data from within a hurricane.

As previously mentioned, UAVs often carry payloads. UAVs are the delivery system for a payload. Currently, payloads are typically held on to a UAV with bolt/washer/locknut assemblies. These assemblies make it difficult to remove and replace the payload, especially at night when visibility is poor. Handling the bolts, washers, and locknuts demands dexterity, and often, even a skilled assembler drops parts, loses them, or otherwise experiences difficulty. The result is increased time to assemble a payload to a UAV and inconsistent assembly quality. In combat or other adverse situations, increased time to assemble a payload to a UAV can prove harmful for the assembler.

SUMMARY

In accordance with the present invention, a payload quick release mechanism for an aerial vehicle is provided. This mechanism improves the ability to quickly attach and remove a payload from an aerial vehicle.

In one embodiment, an attachment device is provided. The attachment device comprises a body with a perimeter and a plurality of arms that extend from the body perimeter. Each arm comprises a first section extending from the body perimeter and a second section that extends at a non-zero angle from the first section.

In another embodiment, a method for attaching a payload to an unmanned aerial vehicle comprises affixing an attachment mechanism to the unmanned aerial vehicle, pressing a payload against the attachment mechanism, rotating the payload while maintaining pressure against the attachment mechanism, until a payload tab on the payload slides over an arm of the attachment mechanism and into an indented portion in the arm, and finally locking the payload tab into a position within the indented portion of the arm of the attachment mechanism.

In a third embodiment, a bayonet style quick release mechanism is provided. The mechanism comprises a body that is affixed to an unmanned aerial vehicle. The body comprises a plurality of arm members. Each arm member has a proximate end that is affixed to the body and a distal end. Each of the plurality of arm members comprises a section sized to receive a payload tab, and a lip at the distal end that is raised above the section. The payload tab extends from the top surface of a payload.

BRIEF DESCRIPTION OF THE DRAWINGS

Various embodiments are described herein with reference to the following drawings. Certain aspects of the drawings are depicted in a simplified way for reason of clarity. Not all alternatives and options are shown in the drawings and, therefore, the invention is not limited in scope to the content of the drawings. In the drawings.

DETAILED DESCRIPTION

Figure 1:
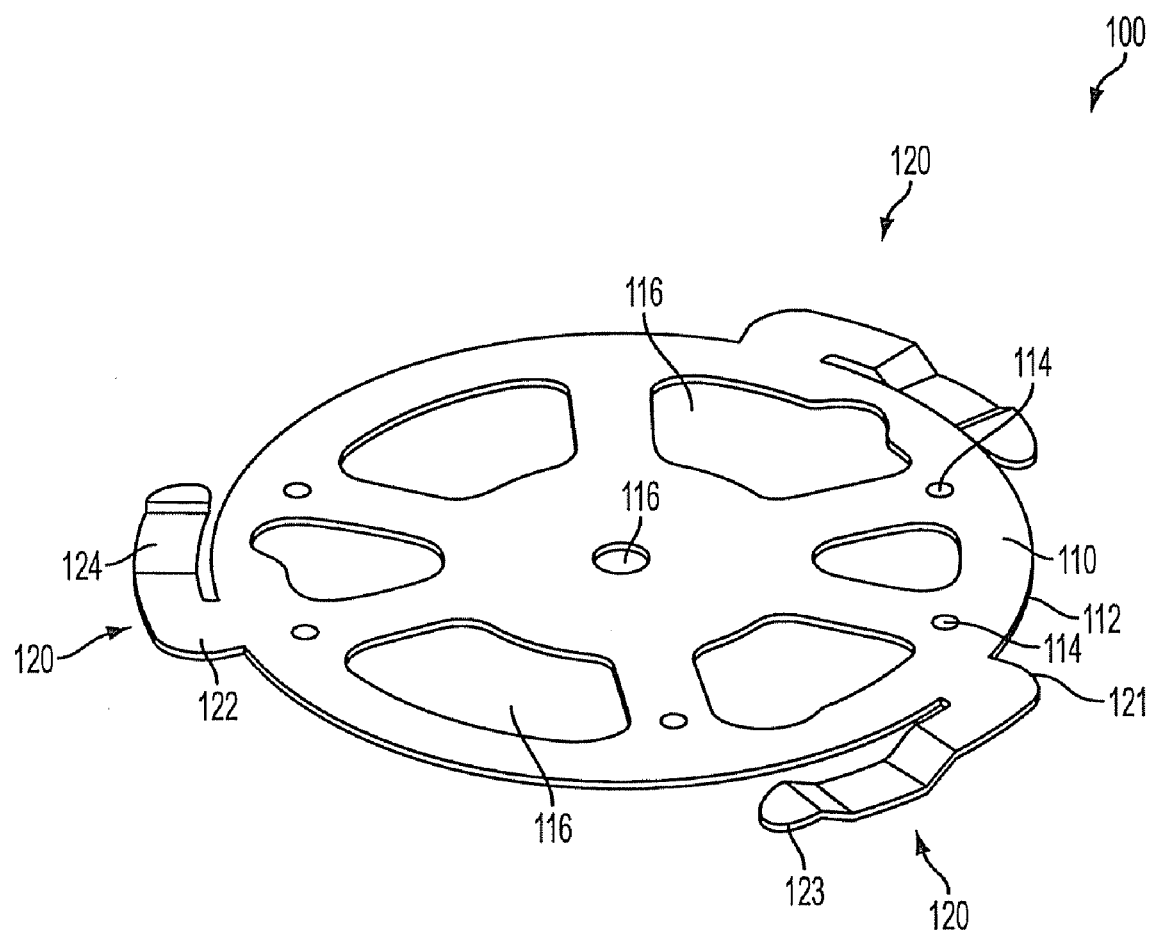
FIG. 1 is a perspective view of a payload quick release mechanism according to one embodiment of the invention.

FIG. 1 depicts a perspective view of a payload quick release mechanism according to one embodiment of the invention.

The payload quick release mechanism 100 includes a body 110 and a plurality of arms 120. Body 110 comprises a perimeter 112. Although a circular perimeter is shown in FIG. 1, perimeter 112 is not limited to a circular shape and various other shapes may be contemplated. Body 110 may be shaped to fit to an aerial system such as an unmanned aerial vehicle (UAV) structure, or a payload present on the UAV. The UAV may be a ducted fan UAV. In the alternative, the UAV may not comprise a ducted fan. Body 110 may comprise a plurality of attachment holes 114 and a plurality of cutouts 116. Attachment holes 114 may be present to affix payload quick release mechanism 100 to a UAV structure on the UAV with attachment devices such as screws. Cutouts 116 may be present to decrease the weight of body 110, or for access to the structure to which payload quick release mechanism 100 is attached.

Each of the plurality of arms 120 comprises a proximate end 121 and a distal end 123. Proximate end 121 may be attached to perimeter 112. In this embodiment, each arm would extend from perimeter 112. In an alternative embodiment, each arm may be formed near the center of body 110 instead of the perimeter 112, to accommodate a payload with a smaller perimeter than the quick release mechanism. Each of the plurality of arms 120 may be manufactured separate from body 110, and may be attached to body 110 prior to use. In the alternative, each of the plurality of arms 120 may be manufactured as part of body 110. Each arm of the plurality of arms 120 comprises a first section 122 and a second section 124. First section 122 may extend substantially orthogonally from body perimeter 112. Second section 124 may extend at a non-zero angle from first section 122.

Payload quick release mechanism 100 may be made from a plastic or a composite material and may be molded into shape. In the alternative, payload quick release mechanism 100 may be machined using a variety of plastic or metal materials. As another alternative, payload quick release mechanism 100 may be made from a formed metal. Once the basic shape of payload quick release mechanism 100 is manufactured, any finishing cutouts 116 or attachment holes 114 may be machined into the part.

Figure 2:
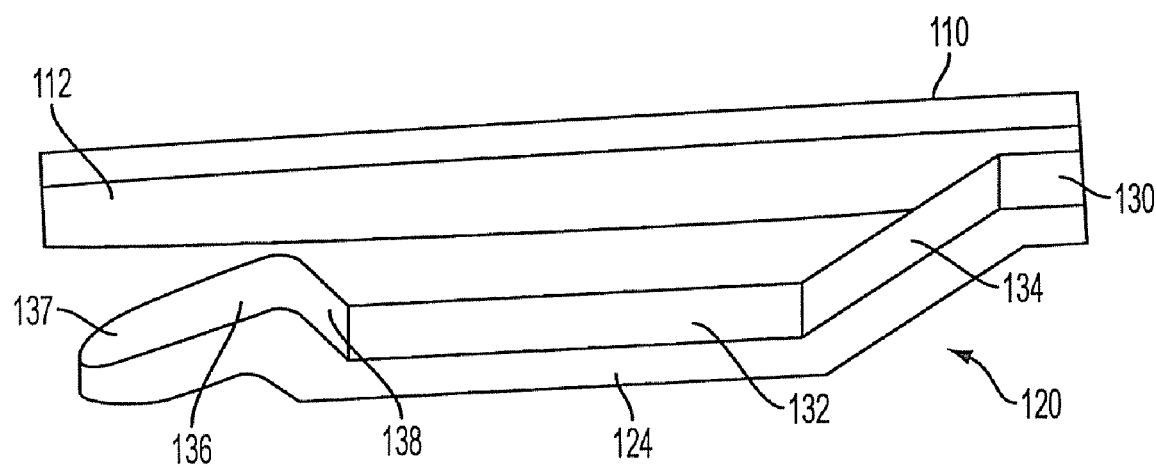
FIG. 2 is an enlarged view of the arm of the payload quick release mechanism of FIG. 1.

FIG. 2 illustrates an enlarged view of second section 124 of the payload quick release mechanism 100 of FIG. 1. Second section 124 may comprise a bayonet-style locking feature. The second section 124 may comprise a first portion 130 on a first plane, a second portion 132 on a second plane, a third portion 134 that extends between the first plane and the second plane, a fourth portion 136 on a third plane, and a fifth portion 138 that extends between the second plane and the third plane. The second plane may be substantially parallel to the first plane. In an alternative embodiment, the second plane may not be parallel to the first plane. The third plane may not be parallel to either the first plane or the second plane. Fourth portion 136 comprises a top surface 137.

In another embodiment, the locking feature may comprise an arm that comprises an indent and a lip, wherein the indent is second portion 132 and the lip is fourth portion 136 as shown in FIG. 2. The entirety of the lip may not lie on the third plane, but may instead be slanted at an angle such that part of the lip or fourth portion 136 dips below the third plane. The arm 120, or any portion thereof, may be manufactured from a material that has a natural resiliency, thus the arm 120, or any portion thereof, has the ability not only to give way and move under exerted pressure, but to return to its original position after the pressure exerted is removed. The indent may be sized to receive a payload tab. The indent is preferably sized to provide a snug fit on either side of the payload tab, and not allow for the payload tab to translate.

Figure 3:
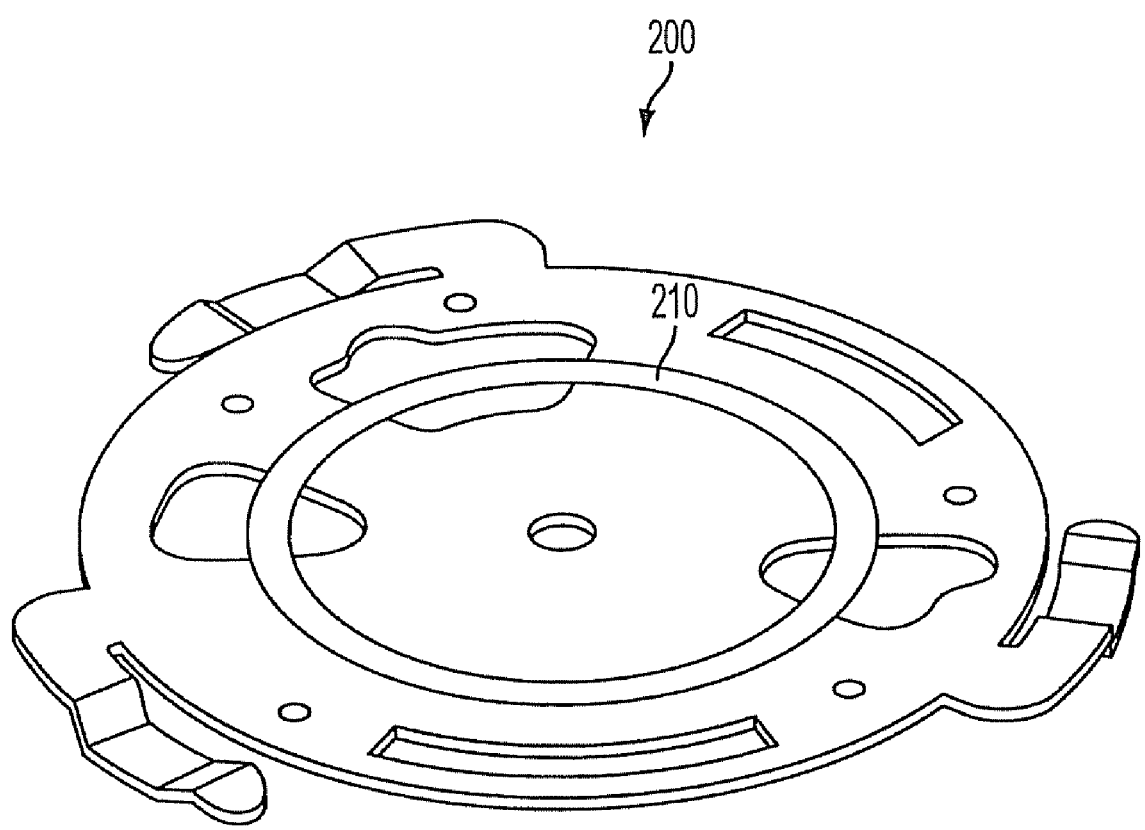
FIG. 3 is a perspective view of a payload quick release mechanism with a radial centering feature.

FIG. 3 is a perspective view of a payload quick release mechanism 200 with a radial centering feature 210. Radial centering feature 210 may be a stepped ring, as shown. Radial centering feature 210 aides in the proper alignment of a payload with payload quick release mechanism 100. This is accomplished by providing radial alignment between the two pieces. Radial centering feature 210 may be manufactured as part of payload quick release mechanism 200 or as a separate piece.

Figure 4B:
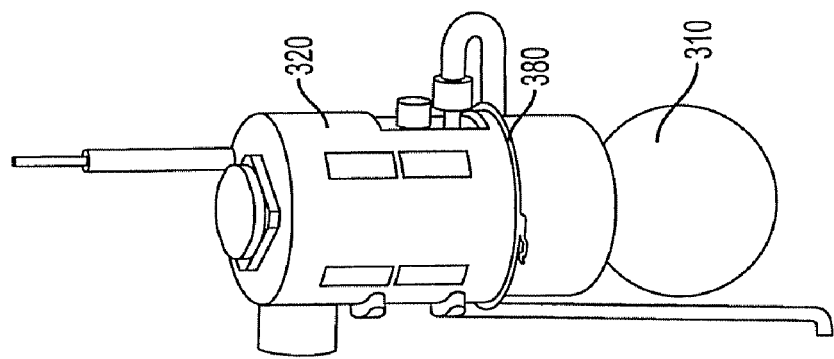
FIGS. 4a and 4b illustrate the payload quick release mechanism of FIG. 1 on an unmanned aerial vehicle payload.
Figure 4A:
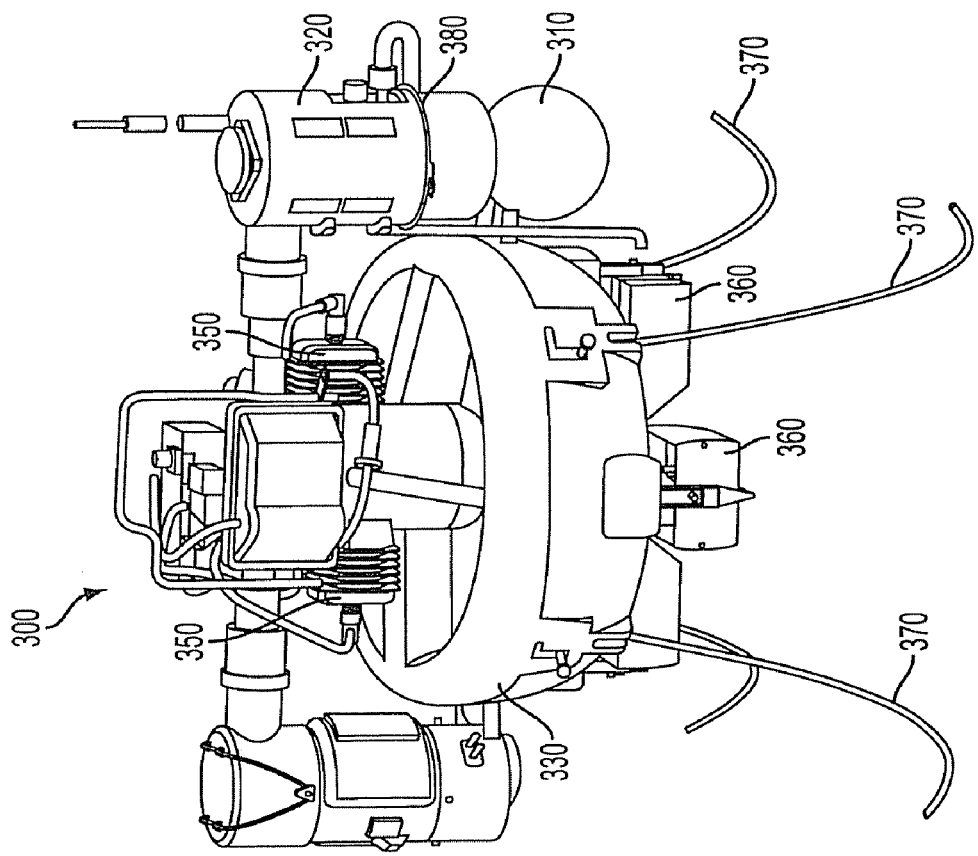
Figure 5:
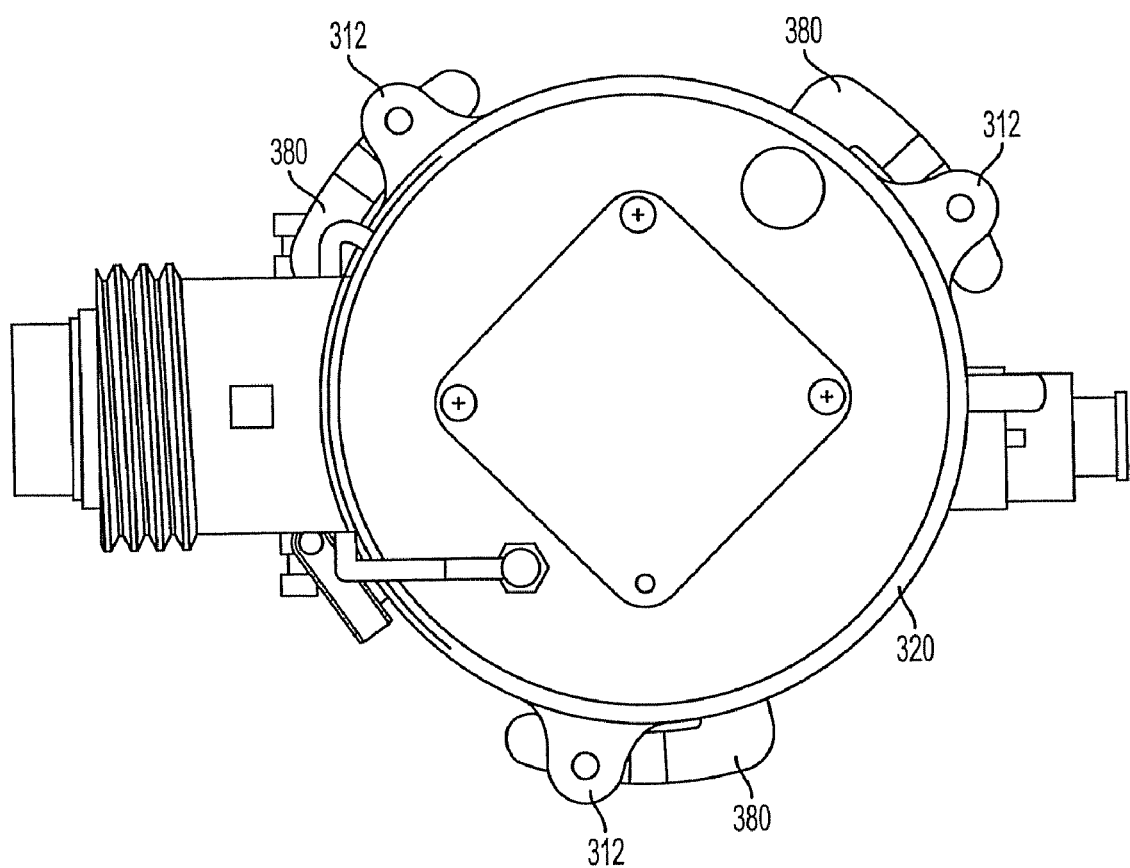
FIG. 5 is an enlarged top view of the structure of FIG. 4b with payload attached using the payload quick release mechanism.

FIG. 4a is an exemplary embodiment of a payload quick release mechanism on a UAV 300, and FIG. 4b is an enlarged view of the structure with the payload attached from FIG. 4a. UAV 300 may comprise a payload 310, a structure 320 to which the payload attaches, an air duct 330, engine cylinders 350, control vanes 360, landing gear 370, and a payload quick release mechanism 380. Structure 320 may be a pod, as shown in FIG. 4b. However, structure 320 is not limited to a pod, and may be another structure on the aerial vehicle. Payload 310 comprises a plurality of payload tabs 312, as shown in FIG. 5, in a top view of the payload and pod configuration of FIG. 4B. Payload tabs 312 may extend substantially orthogonally from the top surface of payload 310. Payload quick release mechanism 380 is designed to have a sliding fit against payload tabs 312, as shown in FIG. 5 when payload 310 is affixed to structure 320 via payload quick release mechanism 380.

In operation, payload quick release mechanism 380 is affixed to structure 320. Payload quick release mechanism 380 may be affixed to structure 320 by inserting screws, rivets, or other attachment mechanisms through attachment holes 114 and actuating the attachment mechanism. Payload 310 is then pressed against payload quick release mechanism 380 and is rotated. When payload 310 is rotated, each of the plurality of payload tabs 312 applies pressure to top surface 137 of fourth portion 136, depressing arms 120. The payload tab 312 slides over the depressed fourth portion 136 and continues to move toward second portion 132 as the payload continues to rotate. The natural resiliency of arms 120 causes fourth portion 136 to snap up and return to the non-depressed position once payload tab 312 is no longer applying pressure to top surface 137. Payload tab 312 rocks into place within the boundaries of second portion 132, the fourth portion 136 stopping payload tab 312, and the payload itself, from further rotation. Payload tab then rests within second portion 132, and is effectively retained within second portion 132. Portion 138 and portion 134 of each arm prohibits rotational movement and ensures the proper clocking of payload 310 with respect to the structure 320, holding payload 310 to UAV 300 in the axial direction. To disassemble or remove payload from the payload quick release mechanism, a user may depress fourth portion 136 to overcome the spring force of arm 120. Payload tab 312 may then be slidingly removed from its position on second portion 132 by rotating the payload in the opposite direction from which it was inserted, effectively reversing the locking turn. That is, fourth portion 136 is depressed to permit removal of the payload from payload quick release mechanism.

This system and method for the assembly and removal of a payload is a simpler procedure than ones in which a user must attach the payload with screws, washers, and locknuts. The risk of losing a part in either the assembly or removal process is mitigated. In addition, the processes afforded by the mechanism for attachment and removal of a payload are quicker to implement than traditional assembly and removal methods, saving a user time.

It should be understood that the illustrated embodiments are examples only and should not be taken as limiting the scope of the present invention. The claims should not be read as limited to the described order or elements unless stated to that effect. Therefore, all embodiments that come within the scope and spirit of the following claims and equivalents thereto are claimed as the invention.

We claim:

1. A system comprising:
   a payload;
   an unmanned aerial vehicle; and
   an attachment device configured to attach the payload to the unmanned aerial vehicle, the attachment device comprising:
      a body configured to be mounted on the unmanned aerial vehicle, wherein the body defines an outer perimeter; and
      a plurality of arms extending radially outward from the outer perimeter of the body, wherein each arm of the plurality of arms comprises a first section extending from and attached to the outer perimeter of the body and a second section that is at a non-zero angle from the first section and is movable with respect to the body.

2. The system of claim 1, wherein the the unmanned aerial vehicle is a ducted fan unmanned aerial vehicle.

3. The system of claim 1, wherein the body defines at least one hole.

4. The system of claim 3, wherein the unmanned aerial vehicle comprises a pod and the body is configured to be affixed to the pod with screws, rivets or attachment mechanisms inserted through the at least one hole defined by the body.

5. The system of claim 1, wherein the outer perimeter defines a circle.

6. The system of claim 1, wherein the second section of each arm of the plurality of arms further comprises a first portion on a first plane, a second portion on a second plane, a third portion that extends between the first plane and the second plane, a fourth portion on a third plane, and a fifth portion that extends between the second plane and the third plane.

7. The system of claim 6, wherein the second plane is substantially parallel to the first plane.

8. The system of claim 6, further comprising a plurality of payload tabs extending orthogonally from the payload, wherein the second section of each arm of the plurality of arms is configured to retain a payload tab of the plurality of payload tabs within the second portion.

9. The system of claim 8, wherein the payload is configured to be rotated about the body such that each second section of the plurality of arms slides under a respective payload tab of the plurality of payload tabs.

10. The system of claim 8, wherein the fourth portion of the second section of each arm of the plurality of arms is configured to transition from a rest position to a depressed position under a downward force of the respective payload tab, returning to the rest position once the respective payload tab is no longer exerting the downward force.

11. The system of claim 8, wherein the fourth portion of the second section of each arm of the plurality of arms is configured to transition from a rest position to a depressed position under an upward force of the respective payload tab, returning to the rest position once the respective payload tab is no longer exerting the upward force.

12. The system of claim 8, wherein the plurality of payload tabs extend from a top surface of the payload.

13. The system of claim 1, wherein the attachment device further comprises a radial centering feature configured to radially align the payload with the attachment device.

14. A method for attaching a payload to an unmanned aerial vehicle, the method comprising:

affixing an attachment mechanism to the unmanned aerial vehicle, the attachment mechanism comprising:
   a body defining an outer perimeter, and
   an arm extending radially outward from the outer perimeter and defining an indent;
pressing the payload against the attachment mechanism, the payload comprising a payload tab;
rotating the payload while maintaining pressure against the attachment mechanism, until the payload tab on the payload slides over the arm extending from the body of the attachment mechanism and into the indent in the arm of the attachment mechanism; and
locking the payload tab into a position within the indent in the arm of the attachment mechanism.

15. The method of claim 14, wherein affixing the attachment mechanism to the unmanned aerial vehicle comprises affixing the attachment mechanism to a pod on the unmanned aerial vehicle.

16. The method of claim 14, further comprising removing the payload from the attachment mechanism, wherein removing the payload from the attachment mechanism comprises:
   depressing the arm; and
   rotating the payload until the payload tab slides out of the indent.

17. A bayonet style quick release mechanism for an unmanned aerial vehicle, the mechanism comprising:
   a body, wherein the body is configured to be affixed to the unmanned aerial vehicle and defines an outer perimeter; and
   a plurality of arm members, wherein each arm member comprises a proximate end and a distal end, the proximate end being affixed to the outer perimeter of the body, wherein the distal end is movable relative to the body, wherein each arm member of the plurality of arm members comprises a section sized to receive a payload tab, and a lip at the respective distal end of the arm member that is raised above the section.

18. The mechanism of claim 17, wherein the payload tab is a section that extends from a top surface of a payload.

19. The mechanism of claim 17, wherein each of the arm members comprises a rest position and a spring force, such that each arm member may return to the rest position after being depressed.

20. The mechanism of claim 17, wherein the body comprises at least one hole.

* * * * *